United States Patent [19]
van de Nieuwelaar et al.

[11] Patent Number: 4,723,339
[45] Date of Patent: Feb. 9, 1988

[54] BREAST SKINNER

[75] Inventors: Josephus A. van de Nieuwelaar, Gemert; Petrus C. H. Janssen, Wilbertoord, both of Netherlands

[73] Assignee: Stork Pmt B.V., Netherlands

[21] Appl. No.: 41,845

[22] Filed: Apr. 23, 1987

[30] Foreign Application Priority Data

Apr. 28, 1986 [NL] Netherlands ................. 8601008

[51] Int. Cl.⁴ .................................... A22C 21/00
[52] U.S. Cl. ................................. 17/11; 17/21; 17/50
[58] Field of Search ..................... 17/11, 21, 50, 62

[56] References Cited

U.S. PATENT DOCUMENTS 4,610,051 9/1986 Martin et al. ............... 17/50 X
4,639,973 2/1987 van der Eerden ............. 17/11

FOREIGN PATENT DOCUMENTS 2485336 12/1981 France ........................ 17/11
8302207 1/1985 Netherlands .................. 17/50

Primary Examiner—Willie G. Abercrombie
Attorney, Agent, or Firm—Newton, Hopkins & Ormsby

[57] ABSTRACT

A device for removing the breast skin from a poultry carcass which is conveyed breast first and hanging by the legs from a conveyor track, comprising a V-shaped guide breast guide disposed below the conveyor track and being open towards the conveyor track, and two V-shaped breast skin separating elements above said face, with the points directed against the direction of conveyance, with at the top rear end of each of the separating elements an oblong-shaped cutting element outside the plane thereof, facing the guide face and with a cutting face directed against the direction of conveyance; followed by at least one set of pinch rollers, situated under the guide face, driven in counter-rotation, and provided with intermeshing longitudinal toothing.

7 Claims, 4 Drawing Figures

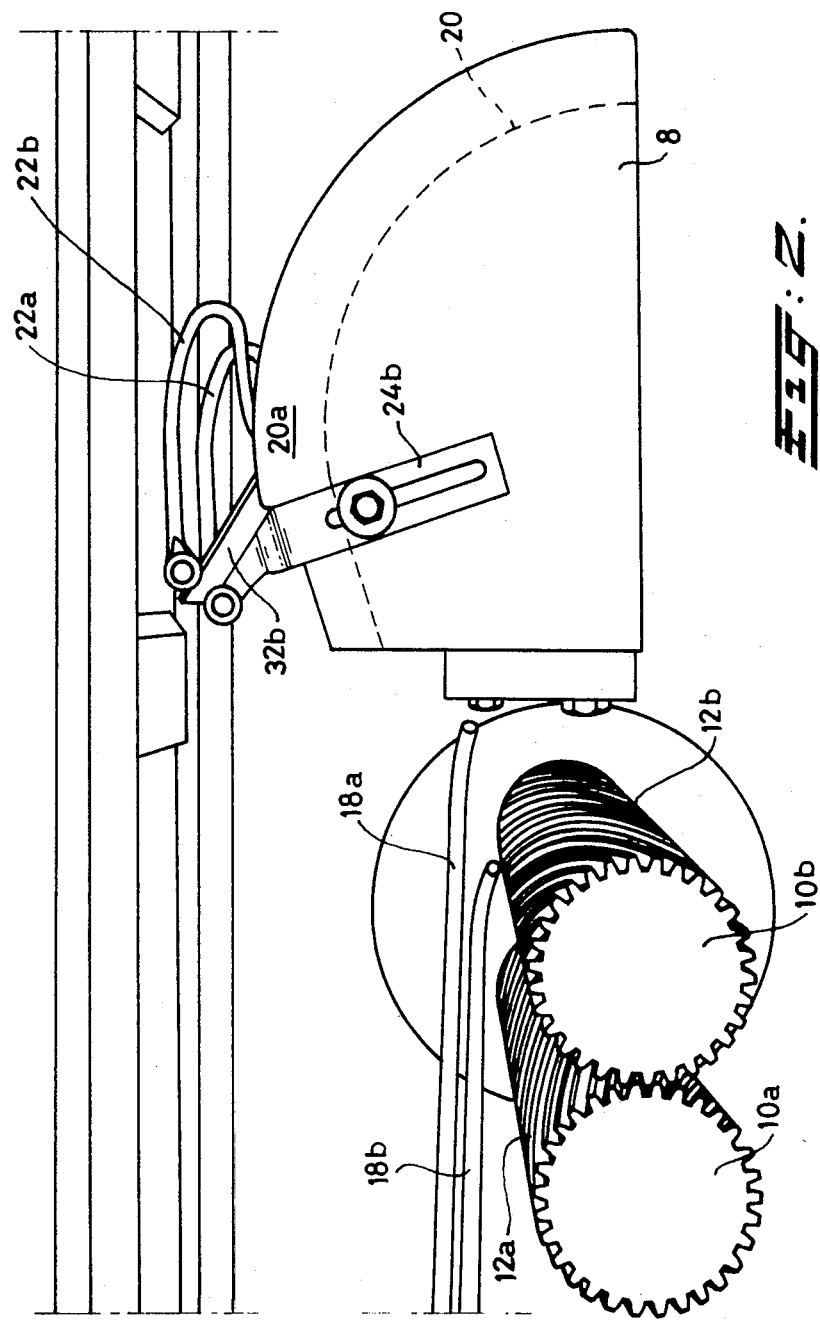

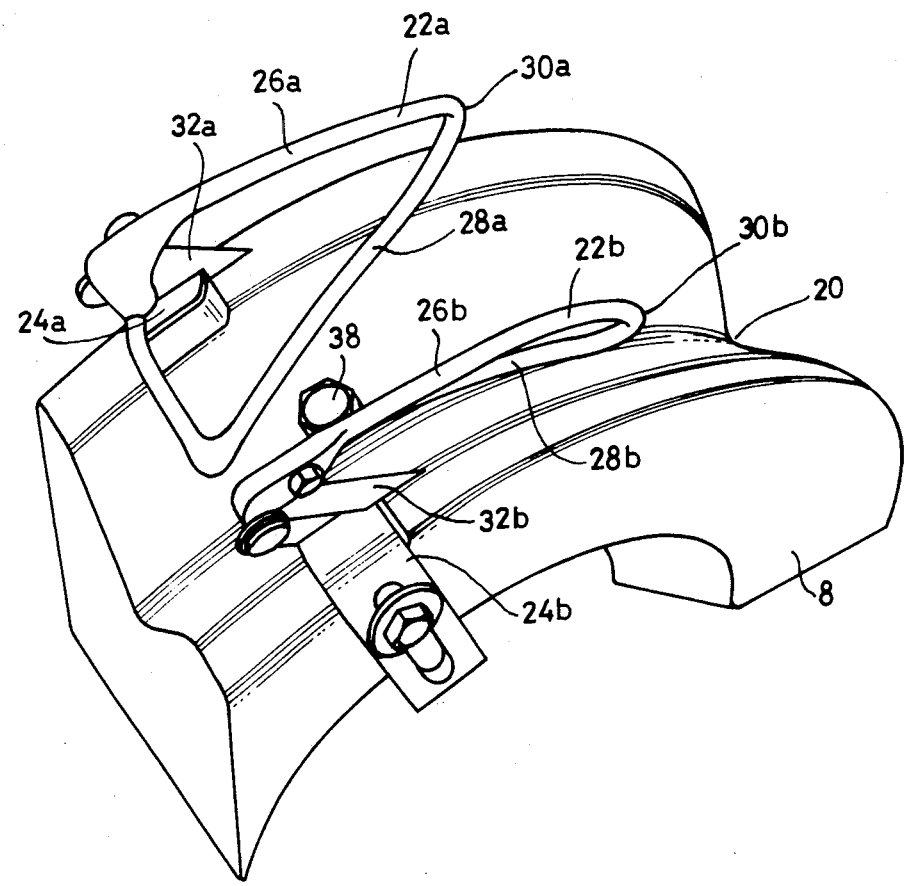

BREAST SKINNER

BACKGROUND OF THE INVENTION

The invention relates to a device for removing the breast skin from a poultry carcass which is conveyed breast first and hanging by the legs from a conveyor track.

In view of the constantly progressing mechanisation of dividing-up of poultry carcasses—where the carcass, hanging by the legs, is conveyed through a number of successive processing stations and is subjected there to dividing-up operations, there is a need for a device by means of which the breast skin can be removed from the carcass in a reliable manner. The object of the invention is to produce such a device.

SUMMARY OF THE INVENTION

The device proposed for this according to the invention is characterized by a V-shaped guide face for the breast of the carcass, said guide face being disposed below the conveyor track and being open towards the conveyor track, and two V-shaped breast skin separating elements which are disposed above the said guide face symmetrically relative to the central longitudinal plane thereof, with the points directed against the direction of conveyance, and the faces of which include an acute angle, with at the top rear end of each of the separating elements an oblong-shaped cutting element lying outside the plane thereof and facing the guide face, with a cutting face directed against the direction of conveyance, in the direction of conveyance followed by at least one set of pinch rollers, situated under the guide face, driven in counter-rotation, and provided with longitudinal intermeshing toothing. Preferably the V-shaped guide fase is designed running up to the conveyor track, and the separating elements are disposed near the highest point thereof, while it is further of advantage when the angle included by the separating elements gradually increases from the input end thereof in the direction of conveyance. Preferably a pressure piece projects from the bottom of the breast guide face near the end of the separating elements, while the cutting elements preferably include an angle of about 45 degrees with the conveyance direction.

In a preferred embodiment a second set of pinch rollers is disposed further on than the first set as seen in the direction of conveyance, and at a higer level than the first set.

The use of two sets of pinch rollers has the advantage that the device can process carcasses of differing sizes: if the breast skin of small carcasses is not gripped by the first set of rollers, it is in any case gripped by the second set.

It is pointed out that the use of two pinch rollers for gripping and pulling away the breast skin of a carcass part, at least one of which rollers being provided with helical grooves, is known per se from Dutch patent application No. 8302207 in the name of the applicants; this known device is, however, suitable only for the removal of the breast skin from a breast piece without legs and wings, the skin of which has thus already been cut into at different places.

DESCRIPTION OF THE DRAWINGS

FIG. 1 is a perspective drawing of the complete device according to the invention;

FIG. 3 is a top view of the breast guide with separating elements;

DESCRIPTION OF THE PREFERRED EMBODIMENTS

Figure 2:
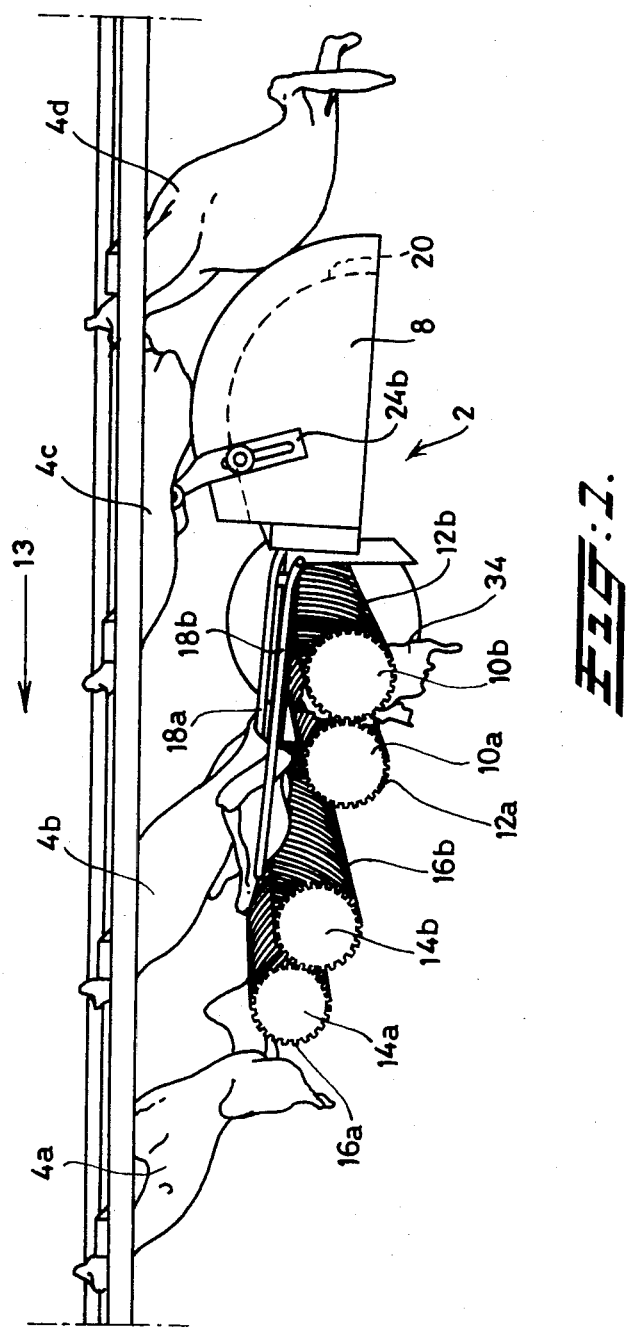
FIG. 2 shows on a larger scale the breast guide with separating elements.

The device according to the invention, indicated in FIG. 1 in its entirety by the reference number 2 will in general be used as part of a plant in which a poultry carcass is subjected to a number of dividing-up operations. The poultry carcasses, indicated by the numbers 4a, 4b 4c and 4d are conveyed through the plant, hanging by the legs from a conveyor track 6, which is, for example, of the type described in European patent application No. 85200366.4.

The device as illustrated comprises a breast guide element 8 with separating elements to be described further, followed in the direction of conveyance by a first set of pinch rollers 10a, 10b, each provided with helical teeth 12a, 12b, running in the longitudinal direction and engaging with each other, and rotatingly driven in opposite directions by means of a drive which is not shown, and in the direction of conveyance, as indicated by the arrow 13, followed by a second set of pinch rollers 14a, 14b, also provided with teeth 16a, 16b, and driven so as to rotate in opposite directions. The pinch rollers 10a, 10b and 14a, 14b are at a lower level than the highest point of the breast guide 8, and the distance of the pinch rollers 14a, 14b from the conveyor track 6 is smaller than the distance of the pinch rollers 10a, 10b from said conveyor track.

Above the rollers 10a, 10b, 14a, 14b are two wing guide bars 18a and 18b.

Figure 4:
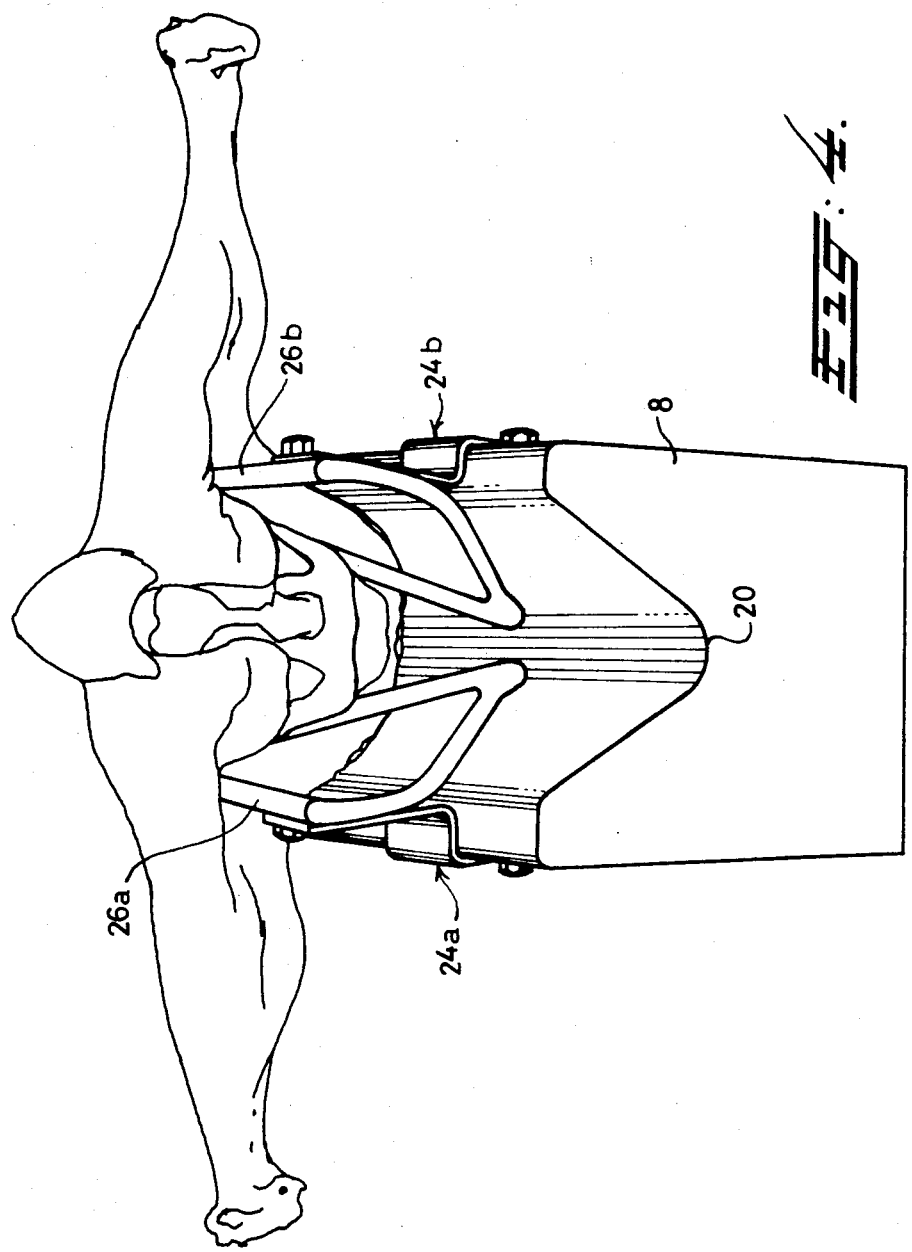
FIG. 4 is a front view of the breast guide with separating elements, with reference to which the separating action is explained.

The structure of the breast guide and the separating elements disposed thereon can be seen from FIGS. 3 and 4. In the embodiment shown the breast guide 8 is formed by a block of plastic in which a quadrantal V-shaped guide groove 20 is formed. Of course, a configuration differing from this circular one is also possible, and the breast guide element 8 can be made of, for example, sheet material. Disposed near the highest point 20a of the groove 20 is a breast skin separating element 22a, 22b on either side of the central longitudinal face of said groove; each separating element is fixed by means of a fixing bracket 24a, 24b to the breast guide element 8. Each separating element 22a, 22b as shown is designed as a bow made of bar material with a top part 26a, 26b running essentially parallel to the conveyor track, a bottom piece 28a, 28b forming an acute angle therewith and running towards the bottom of the guide groove 20, and a cross piece 30a, 30b. As can be seen from the figures, the angle included by the planes through the bow parts 26a, 28a, on the one hand, and 26b, 28b, on the other, looking from the input points 30a, 30b in the direction of conveyance, gradually increases and reaches the maximum value at the point of the cross connection 30a, 30b. It will be appreciated that a separating element made of sheet material can also be used, instead of a bow-shaped separating element.

The bows 28a, 28b also carry cutting knives 32a, 32b including an angle of about 45 degrees with the direction of conveyance.

The device operates as follows (see also FIG. 4):

Each carcass hanging by the legs, such as carcass 4d, reaches the breast supporting element 8 during its conveyance through the device and, starting from the position shown for the carcass 4d, gradually assumes the position as shown for the carcass 4c, in which the carcass is thus lying virtually horizontally below the conveyor track 6. During this movement the points 30a, 30b of the separating elements 22a, 22b penetrate at the groins between the skin and the carcass; during the further movement the skin is pressed upwardly to the left and right of the separating elements 22a, 22b and held taut, and when the skin is at its most taut when passing the widest part, it is finally cut through by the knives 32a, 32b. The breast skin now hanging down and still partially attached to the carcass, such as the breast skin 34 as shown for the carcass 4b, comes between the pinch rollers 10a, 10b and is pulled away from the carcass; finally, the breast 36 of the carcass has the breast skin 34 completely removed from it.

If—as can happen in the case of a smaller bird—the breast skin is not gripped by the first set of pinch rollers 10a, 10b, it is sure to be gripped by the second set of pinch rollers 14a, 14b and removed by them.

Of course, various modifications are possible with the scope of the invention. For example, it can be desirable—in particular for handling small birds—to provide on the bottom of the guide groove 20 of the breast supporting element 8 near the highest point thereof and between the separating elements 22a, 22b a pressure piece 38 projecting from the groove, for the purpose of pressing the breast bone of the bird upwards to some extent during the running in of the separating elements 22a, 22b.

What is claimed is:

1. A device for removing the breast skin from a poultry carcass which is conveyed breast first and hanging by the legs from a conveyor track, comprising a V-shaped guide face for the breast of the carcass, said guide face being disposed below the conveyor track and being open towards the conveyor track, and two V-shaped breast skin separating elements which are disposed above the said guide face symmetrically relative to the central longitudinal plane thereof, with the points directed against the direction of conveyance, and the faces of which include an acute angle, with at the top rear end of each of the separating elements an oblong-shaped cutting element lying outside the plane thereof and facing the guide face, with a cutting face directed against the direction of conveyance, in the direction of conveyance followed by at least one set of pinch rollers, situated under the guide face, driven in counter-rotation, and provided with longitudinal intermeshing toothing.

2. A device according to claim 1, in which the V-shaped guide face is designed running up to the conveyor track, and the separating elements are disposed near the highest point thereof.

3. A device according to claim 2, in which the angle included by the separating elements gradually increases from the input end thereof in the direction of conveyance.

4. A device according to claim 1, in which a pressure piece projects from the bottom of the breast guide face near the end of the separating elements.

5. A device according to claim 1, in which the cutting elements include an angle of about 45 degrees with the conveyance direction.

6. A device according to claim 1, comprising a second set of pinch rollers disposed further on than the first set as seen in the direction of conveyance, and at a higher level than the first set.

7. A device according to claim 1, comprising two wing guide bars disposed on either side of the longitudinal central plane of the conveyor device above the pinch rollers.

* * * * *